US008612847B2

(12) United States Patent  
Sorotokin et al.

(10) Patent No.: US 8,612,847 B2
(45) Date of Patent: Dec. 17, 2013

(54) EMBEDDING RENDERING INTERFACE

(75) Inventors: Peter Sorotokin, Cupertino, CA (US); Richard Wright, Palo Alto, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1090 days.

(21) Appl. No.: 11/737,681

(22) Filed: Apr. 19, 2007

(65) Prior Publication Data

US 2008/0082907 A1    Apr. 3, 2008

Related U.S. Application Data

(60) Provisional application No. 60/828,063, filed on Oct. 3, 2006, provisional application No. 60/862,583, filed on Oct. 23, 2006.

(51) Int. Cl.
*G06F 17/00*    (2006.01)

(52) U.S. Cl.
USPC .......... 715/236; 715/243; 715/255; 715/209; 715/210; 715/234

(58) Field of Classification Search
USPC .................. 715/236, 243, 255, 209, 210, 234
See application file for complete search history.

(56) References Cited

U.S. PATENT DOCUMENTS

| | | | | |
|---|---|---|---|---|
| 5,715,382 | A * | 2/1998 | Herregods et al. | 358/1.18 |
| 5,764,241 | A | 6/1998 | Elliott et al. | |
| 6,065,024 | A * | 5/2000 | Renshaw | 715/234 |
| 6,343,310 | B1 | 1/2002 | DeRienzo | |
| 6,518,976 | B1 * | 2/2003 | Curtis et al. | 345/621 |
| 6,546,397 | B1 | 4/2003 | Rempell | |
| 6,567,098 | B1 * | 5/2003 | D'Amora | 345/611 |
| 6,687,745 | B1 | 2/2004 | Franco et al. | |
| 6,760,019 | B1 * | 7/2004 | Graham | 345/418 |
| 7,346,920 | B2 | 3/2008 | Lamkin et al. | |
| 2001/0040584 | A1 * | 11/2001 | Deleeuw | 345/629 |
| 2001/0043345 | A1 * | 11/2001 | Rumph et al. | 358/1.9 |
| 2002/0154214 | A1 * | 10/2002 | Scallie et al. | 348/51 |
| 2003/0061305 | A1 * | 3/2003 | Copley et al. | 709/217 |
| 2003/0179214 | A1 * | 9/2003 | Saund et al. | 345/619 |
| 2004/0103207 | A1 * | 5/2004 | Elman et al. | 709/231 |
| 2004/0189668 | A1 * | 9/2004 | Beda et al. | 345/619 |
| 2005/0243346 | A1 * | 11/2005 | Foehr et al. | 358/1.9 |
| 2005/0248790 | A1 * | 11/2005 | Ornstein et al. | 358/1.12 |
| 2006/0004778 | A1 | 1/2006 | Lamkin et al. | |
| 2006/0020469 | A1 * | 1/2006 | Rast | 704/270 |
| 2006/0136553 | A1 * | 6/2006 | Villaron et al. | 709/203 |

(Continued)

OTHER PUBLICATIONS

Microsoft PressPass, "The New York Times to Enhance Online and Offline Reading Experience With Times Reader," available at http://www.microsoft.com/presspass/press/2006/apr06/04-28TimesRe..., Copyright 2006 Microsoft Corporation, 3pp.

(Continued)

*Primary Examiner* — Nathan Hillery
(74) *Attorney, Agent, or Firm* — Finch & Maloney PLLC

(57) ABSTRACT

Methods, computer program products and systems for accessing an electronic document, the electronic document including embedded content, where the file type of the electronic document differs from the file type of the embedded content. The embedded content is provided to a first rendering engine in accordance with the embedded content file type. Rendered embedded content is received from the first rendering engine. The rendered embedded content is blended with a rendering of a page of the electronic document.

18 Claims, 5 Drawing Sheets

(56) References Cited

U.S. PATENT DOCUMENTS

| | | | |
|---|---|---|---|
| 2006/0146053 A1* | 7/2006 | Gatewood et al. | 345/440 |
| 2007/0100701 A1* | 5/2007 | Boccon-Gibod et al. | 705/21 |
| 2008/0040359 A1* | 2/2008 | Arrouye et al. | 707/100 |
| 2008/0041220 A1* | 2/2008 | Foust et al. | 84/625 |
| 2008/0082911 A1 | 4/2008 | Sorotokin et al. | |

OTHER PUBLICATIONS

Ryan Stewart, "The Universal Desktop: The New York Times Reader—technically simply, conceptually spectacular," available at http://blog.zdnet.com/Stewart/?p=98, Aug. 31, 2006, 3pp.

"Media Queries, W3C Candidate Recommendation Jul. 8, 2002," available at http://www.w3.org/TR/2002/CR-css3-mediaqueries-20020708/, Copyright 2002 W3C, 18pp.

Adobe Systems Incorporated, "PDF Reference Manual, Fifth Edition" 2004, 1236 pages.

DiRienzo, Andrew, letter of May 30, 2008, third-party submission regarding patent 6,343,310, 7 pages.

Hellsing, David; No More CSS Hacks; 2004; http://www.stylegala.com/articles/no_more_css_hacks.htm; pp. 1-21, especially pp. 1-4.

Written Opinion of the International Searching Authority for PCT Application No. PCT/US07/80122, dated Oct. 10, 2008.

Written Opinion of the International Searching Authority for PCT Application No. PCT/US07/80336, dated Oct. 27, 2008.

Browser Sniffer/Screen Resolution Sniffer that swaps stylesheets, http://thedesignspace.net/MT2archives/000063.html (pp. 1-5, 2003).

International Preliminary Report on Patentability for PCT Application No. PCT/US2007/080122, dated Apr. 7, 2009, 5 pages.

International Preliminary Report on Patentability for PCT Application No. PCT/US2007/080336, dated Apr. 7, 2009, 8 pages.

Laura Lemay, Arman Danesh; "Teach Yourself Web Publishing with HTML 4 in a Week"; Sams Publishing; Fourth Edition; pp. 357, 558, wiii.

* cited by examiner

EMBEDDING RENDERING INTERFACE

CROSS-REFERENCE TO RELATED APPLICATIONS

This application claims priority to U.S. Patent Application No. 60/828,063, entitled ELECTRONIC PUBLISHING, to inventors William H. McCoy, et al., which was filed on Oct. 3, 2006. This application also claims priority to U.S. Patent Application No. 60/862,583, entitled RENDERING EMBEDDED CONTENT, to inventors Richard Wright, et al., which was filed on Oct. 23, 2006. The disclosures of the above applications are incorporated herein by reference in their entirety.

BACKGROUND

The present disclosure relates to software and, in particular, to software for rendering electronic documents.

Electronic documents (or documents) can include various kinds of content. For example, a word processing document can contain text, a embedded video presentation, and an embedded electronic spreadsheet—all of which have a visual representation on one or more pages of the document. Documents can be represented as tree data structures where leaf nodes represent content (e.g., text, video presentations, spreadsheets) and non-leaf nodes represent groupings or arrangement of content. Trees can be used to display and modify documents by software applications. Software applications for specific types of documents (e.g., a word processors, spreadsheets) typically have a predetermined set of content types that they can natively render. Applications conventionally deal with non-native content by ignoring the content, translating the content into a native format and rendering the native format. Alternatively, applications can invoke auxiliary software (e.g., Object Linking and Embedding/ActiveX) to render the content into a fixed rectangular region on a rendering of a document page. But the above approaches do not allow embedded content to be composited since the embedded content is rendered without reference to other embedded content.

SUMMARY

In general, one aspect of the subject matter described in this specification can be embodied in a method that includes accessing an electronic document, the electronic document including embedded content, where the file type of the electronic document differs from the file type of the embedded content. The embedded content is provided to a first rendering engine in accordance with the embedded content file type. Rendered embedded content is received from the first rendering engine. The rendered embedded content is blended with a rendering of a page of the electronic document. Other implementations of this aspect include corresponding systems, apparatus, and computer program products.

These and other implementations can optionally include one or more of the following features. The embedded content further includes nested content and the file type of the embedded content differs from a file type of the nested content. The first rendering engine is further configured to: 1) provide the nested content to a second rendering engine; and 2) receive rendered nested content from the second rendering engine. The rendered nested content can be composited with the rendered embedded content. A transparency model transformation matrix can be applied to the rendered embedded content. The embedded content file type is PDF, Flash, HTML, ShockWave, or SVG. The embedded content further includes nested content, and the file type of the embedded content differs from a file type of the nested content, the method further comprising: 1) providing the nested content to a second rendering engine in accordance with the nested content file type; 2) receiving rendered nested content from the second rendering engine; and 3) blending the rendered nested content with the rendered embedded content. It is determined if a user can access the document. The plurality of rendering engines comprise reentrant rendering engines.

Particular implementations of the subject matter described in this specification can be implemented to realize one or more of the following advantages. Documents can contain an unlimited amount of embedded content of varying content file types. Any number of rendering engines can be incorporated into the document rendering system as long as each rendering engine implements a common API. Rendering engines can be obtained dynamically, on an as-needed basis, in order to render a document. Rendering engines are reentrant; that is, they can be invoked more than once before they have completed a rendering task. Moreover, rendering engines are aware of, and can take advantage of, a transparency model for compositing rendered content on a document page. Rendering engines can be written independently of each other and use different rendering primitives. A common rendering software library is not required.

The details of one or more implementations of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
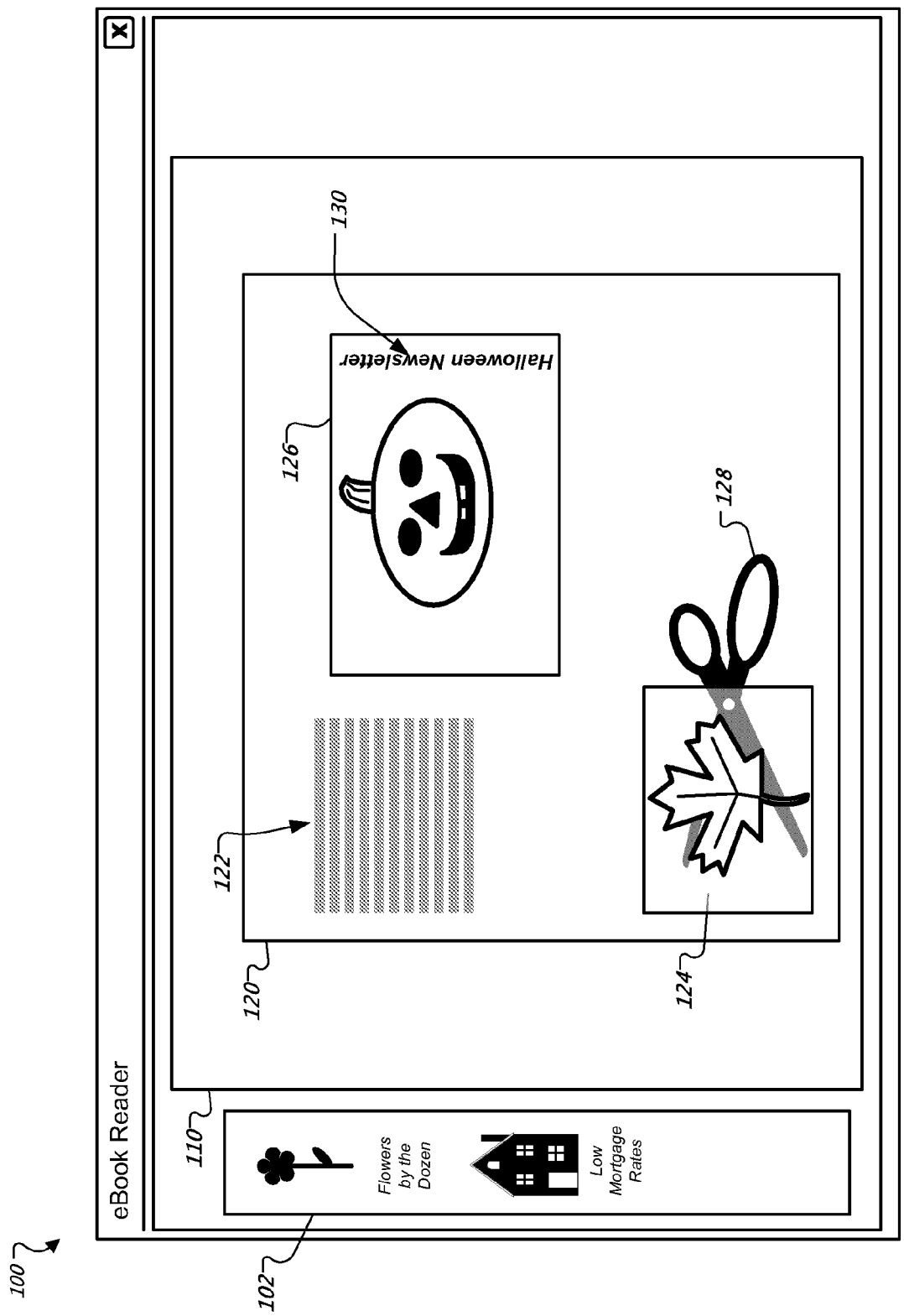
FIG. 1A illustrates a graphical user interface for presenting electronic documents such as eBooks on display devices.

FIG. 1A illustrates a graphical user interface 100 for presenting electronic documents such as eBooks on display devices such as those provided by eBook readers (e.g., Sony EBR-1000 Librie eBook reader, available from Sony Corporation of America, New York, N.Y.), mobile telephones, electronic games, portable media players, and other suitable devices. An electronic document (which for brevity's sake will simply be referred to as a document) does not necessarily correspond to a file. A document can be stored in a portion of a file that holds other documents, in a single file dedicated to the document in question, or in multiple coordinated files. A document can be stored in memory (e.g., random access memory) without first having been stored in a file. Moreover, a document can be streamed from one or more locations specified by, for example, uniform resource locators.

Generally speaking, documents contain content or "flows" (e.g., paragraphs of text, images, tables—which are called elements of the flow) that are structured in some fashion. In various implementations, documents conform to the Open eBook Publication Structure (OEBPS) standard promulgated by the International Digital Publishing Forum (IDPS). Documents can include content having different content file types such as Adobe Portable Document Format (PDF), Adobe Flash, HyperText Markup Language (HTML), Adobe Shock-Wave, or Scalable Vector Graphics (SVG). Other content file types are possible. Adobe products are available from Adobe Systems Incorporated of San Jose, Calif. Additionally, content of a particular content file type can further contain nested or embedded content having a different content file type. For example, a PDF document could contain an embedded Flash content, which in turn could contain an HTML content.

In some implementations, the user interface 100 includes a visual region 110 configured to present a document. In further implementations, the user interface 100 includes a separate, second visual region 102 for presenting advertisement content (or "ads"). The subject of the ads can correspond to the content of the document. For example, if a document presented in the first visual region 110 pertains to crafts, the second visual region 102 can present one or more ads for craft-related products or services. Inclusion of such ads can facilitate monetization for content providers. In certain implementations, ads can be turned on or off, for example, based flags or attributes in a document. For instance, a document corresponding to premium content can turn off the ads.

The user interface 100 can be used to render (or display) one or more documents 120, which can be of any content file type, such as OEBPS, PDF, Flash, HTML, ShockWave, and/or SVG, for example. By way of illustration, a document 120 can be in Flash format, and the user interface 100 can utilize a Flash rendering engine capable of rendering Flash content. Similarly, a document 120 can have a different content file type, and the user interface 100 can utilize a rendering engine that is capable of rendering content of that content file type. In general, a rendering engine is capable of rendering content of one or more content file types.

The document 120 presented in region 110 can also serve as a container document for embedded content. By way of illustration, the document 120 has a content file type of OEBPS and contains the following embedded content: text 122 having a content file type of Unicode, a maple leaf image 124 having a content file type of PDF, a pumpkin image 126 having a content file type of Flash, a scissors graphic 128 embedded within the image 124 and having a content file type of SVG, and a text caption 130 embedded within a Flash document 126 and having a content file type of HTML.

Various rendering engines (e.g., OEBPS, PDF, Flash, HTML, ShockWave, SVG) can be utilized to render embedded content in the document 120. Rendering engines have access to a document's transparency model which allows the rendering engines to composite embedded content with other content on a page of the document. This allows for effects such as transparency and blending. This is illustrated in FIG. 1A where the maple leaf image has a region surrounding the leaf that is blended the underlying scissors graphic 128. Also, the "Halloween Newsletter" caption 130 shows through a transparent region of the pumpkin image 126.

Figure 1B:
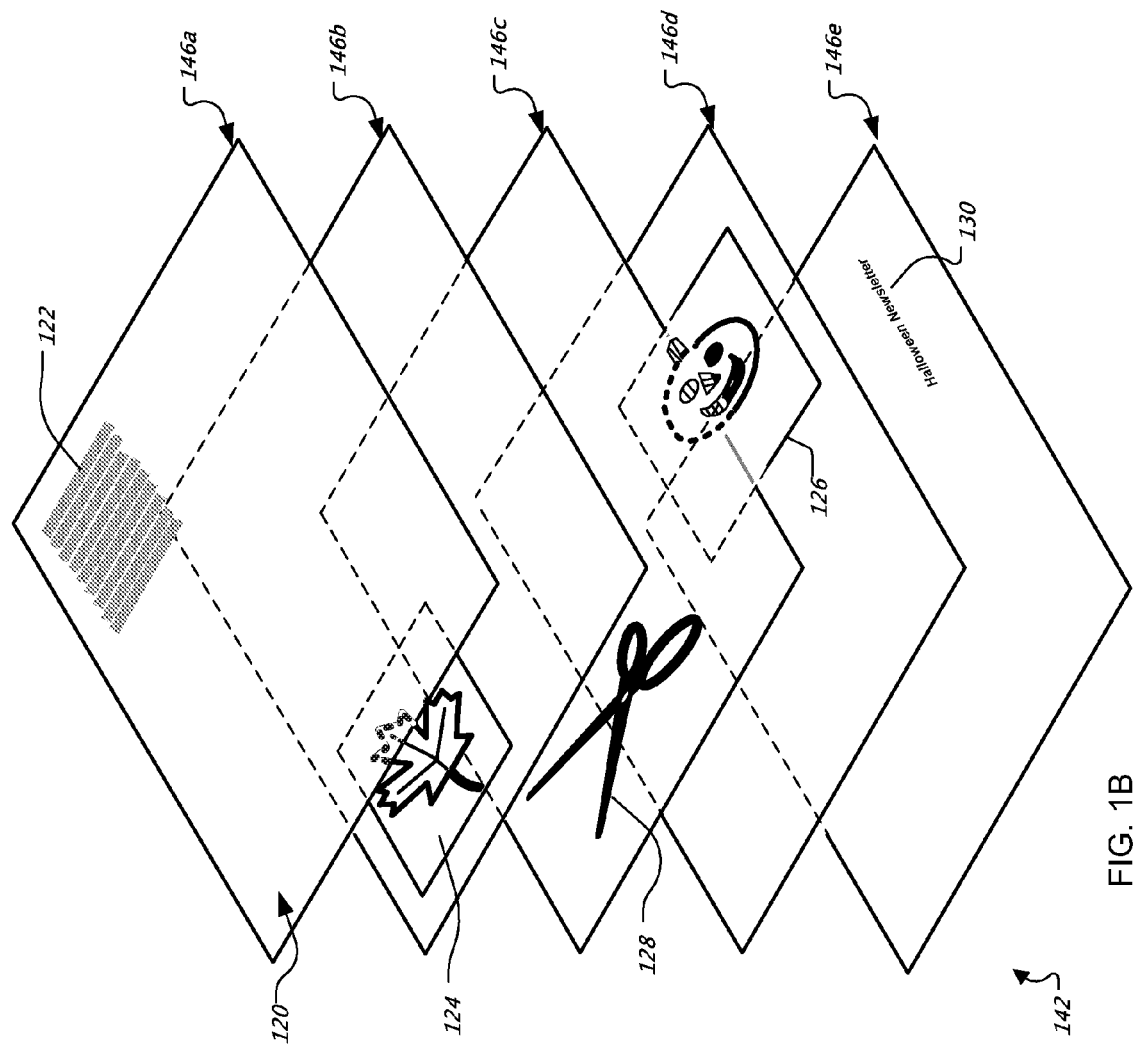
FIG. 1B is an example of rendered content in an electronic document as represented by a tree and a transparency stack.
Figure 1B:
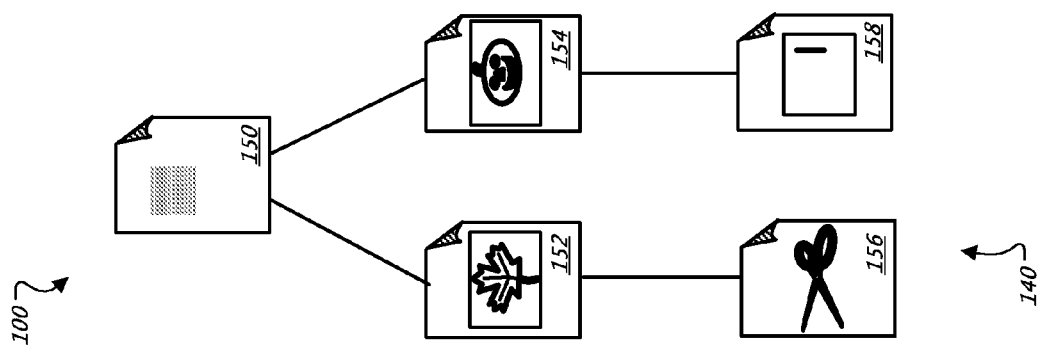

As shown in FIG. 1B, content in a document (e.g., 120) is logically represented for rendering purposes in a transparency model as a transparency stack 142. The color of a pixel or point in a rendered portion of a document page is determined by combining the colors of content in the transparency stack according to compositing rules defined by the transparency model or elsewhere. In various implementations, the transparency model conforms to the model defined in the PDF REFERENCE: FIFTH EDITION, ADOBE® PORTABLE DOCUMENT FORMAT VERSION 1.6 (Adobe Systems Incorporated), which is incorporated herein by reference in its entirety. Other transparency models are possible, however.

In the transparency model, newly rendered content can be composited with the previously existing contents of the page, producing results that combine the colors of the new content and its backdrop according to their respective opacity characteristics. Moreover, transparent content can blend (composite) in interesting ways with other overlapping contents. Ordinarily, the backdrop consists of portions of layers of the transparency stack that have previously rendered. The result of compositing is then treated as the backdrop for the next content. However, within certain kinds of transparency groups (see below), a different backdrop can be used.

When content is composited with its backdrop, the color at each point can be computed using a specified blend mode, which is a function of both the content's color and the backdrop color. The blend mode determines how colors interact; different blend modes can be used to achieve a variety of useful effects. In various implementations, a single blend mode is in effect for compositing all of a given content, but different blend modes can be applied to different contents. A given content's opacity, in combination with the backdrop's opacity, determines the relative contributions of the backdrop color, the content's color, and the blended color to the resulting composite color. In addition, the content's shape can determine the degree to which the composite color replaces the backdrop color. For example, shape values of 0.0 and 1.0 identify points that lie outside and inside a conventional sharp-edged content; intermediate values are useful in defining soft-edged content.

Content in a transparency stack can be collected together into a transparency group (referred to hereafter simply as a group). The group as a whole can have various properties that modify the compositing behavior of content within the group and their interactions with its backdrop. An additional blend mode, shape, and opacity can also be associated with the group as a whole and used when compositing it with its backdrop. Groups can be nested within other groups, forming a tree-structured hierarchy.

With reference to FIG. 1B, the transparency stack 142 includes two or more layers 146a-146e that represent logical planes on which content is represented. (Dashed lines are used to indicate overlapping layers and content.) When rendered, content on a given layer can incorporate content from one or more lower layers. For example, the maple leaf image content 124 on layer 146b can composited with the scissors graphic content 128 from layer 146c. In various implementations, embedded content can be represented on a lower plane in the transparency stack 142 than the content that contains the embedded content. This allows the rendering of embedded content to be composited with the rendering of containing content.

A document (e.g., 120) has a hierarchical structure which can be expressed as a tree 140. The tree 140 is composed of a hierarchy of nodes 150, 152, 154, 156 and 158. Each node corresponds to content depicted in one of the layers 146a-146e of the transparency stack 142. While the transparence stack 142 illustrates compositing layers for rendering purposes, the structure of the tree 140 represents the hierarchy of nested content in the document 120. For example, the top-level document node 150 represents top-level content (the text 122) and embedded content represented by child node 152 (the maple leaf image 124) and child node 154 (the pumpkin image 126). The node 152 has embedded content represented by child node 156 (the scissors graphic 128). Likewise, the node 154 has embedded content represented by child node 158 (the caption 130).

Figure 2:
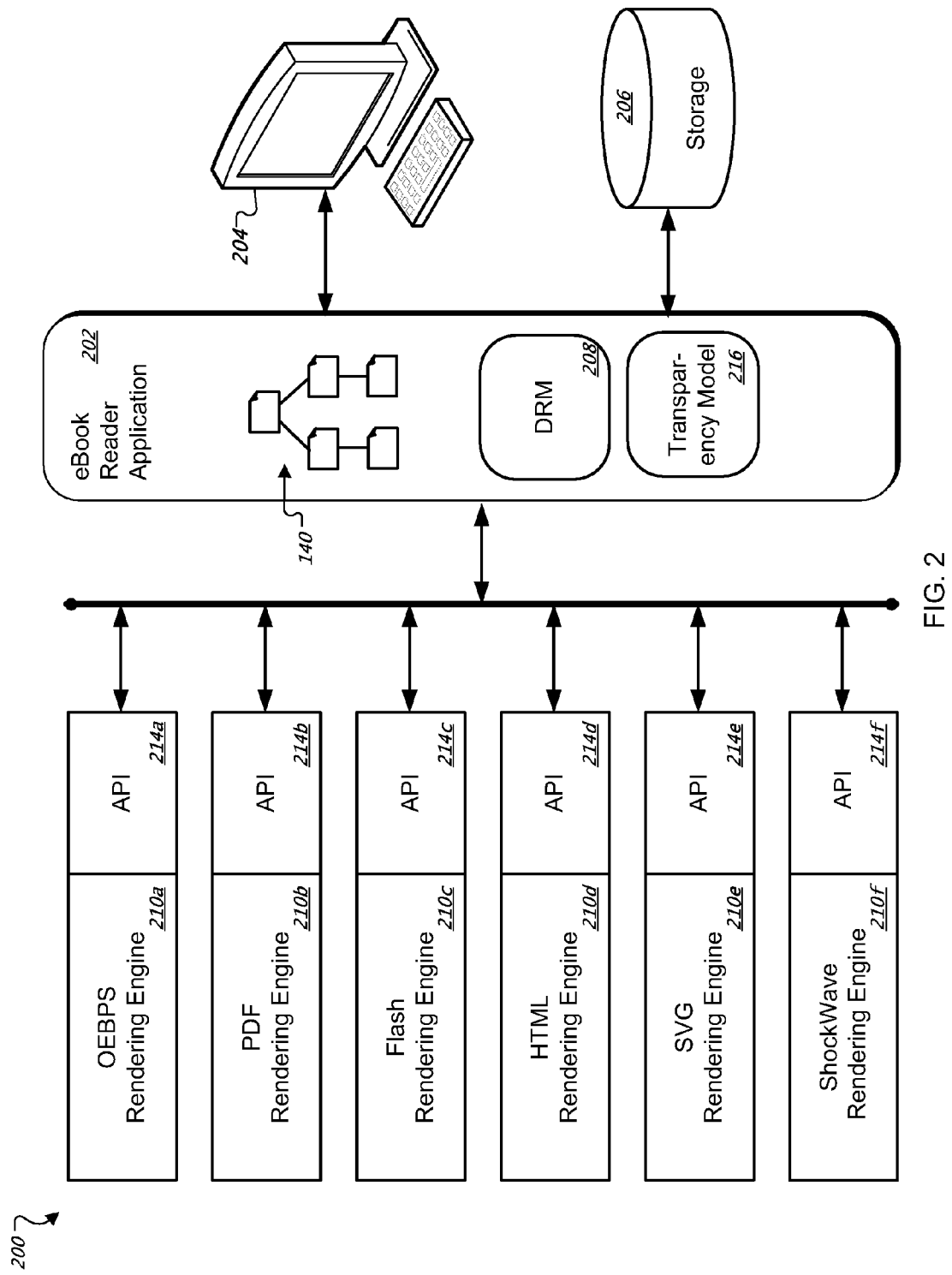
FIG. 2 is an example of a system for using various rendering engines and a transparency model to render an electronic document having multiple content file types.

FIG. 2 illustrates a system 200 for rendering documents having content of different content file types. The system 200 includes an eBook reader application 202 (e.g., implemented in Flash or in one or more other suitable applications). The eBook reader application 202 can invoke rendering engines to render documents on one or more display devices 204. The documents processed by the eBook reader application 202 can be obtained from storage 206, which can be local storage, remote storage, or some combination of local and remote storage available over one or more networks. For example, the eBook reader application 202 can render documents obtained over the Internet or stored on a mobile phone.

The eBook reader application 202 includes a transparency model 216, as described above. The transparency model 216 is a set of information regarding the rendering state of a document page. In various implementations, each piece of content (including embedded content) on a page is associated with the following information in order to integrate with the transparency model 216:

- Scaling, rotation, or any other affine transformations
- Clipping with an arbitrary path
- Masking
- Opacity including group opacity
- Blending modes, including blending of the embedded content with the environment
- Isolated and non-isolated groups
- Knock-out groups (e.g., if all rendering engines support shape channels).

For example, when embedded content can be scaled, clipped, masked, made semi-transparent, or blended.

In various implementations, a document such as document 120 can be rendered by traversing a tree representation of the document in a depth-first fashion and rendering each visited node using the appropriate rendering engine. For example, a first rendering engine can be invoked to render content for top-level document node 150. The first invoked rendering engine renders the text 122 and then invokes a second rendering engine to rendered the embedded content for node 152. Before the second rendering engine can render the content for node 152 (the maple leaf image 124), the second rendering engine invokes a third rendering engine to render the content (the scissors graphic 128) for node 156, which appears at a lower layer in the transparency stack. Once the third rendering engine has rendered the scissors graphic 128, the second rendering engine can render the maple leaf image 125 composited with the scissors graphic 128. In various implementations, rendering engines are reentrant so that they can be invoked successively. For example, a PDF document containing embedded PDF content can require that a PDF rendering engine be invoked twice: first for the containing document and again—before completing the rendering of the first content—for the embedded content.

In various implementations, when a rendering engine encounters embedded content which the rendering engine does not know how to render (e.g., corresponding to a child node in the tree 140), the rendering engine invokes another rendering engine which can render the content and provides, directly or indirectly, the invoked rendering engine with the transparency model information listed in TABLE 1.

TABLE 1

| PARAMETER | DESCRIPTION |
| --- | --- |
| Bounding box | Pixel-based bounding box of the document page area that needs to be rendered. |
| Drawing surface | A bitmap surface or a set of scanlines on which to render. Bitmap surfaces upon which rendering engines operate are compatible and support transparency channel (and shape channel if knock-out groups are needed). |
| Background | A background bitmap of the rendering surface which can be blended with the embedded content. This is the transparency model backdrop. |
| Blending mode | Embedded content blending mode. |
| Transformation Matrix | While rendering can occur into the surface which is aligned with the pixel grid, rendering embedded content uses the transparency model's current transformation matrix to position embedded document correctly with respect to a rendering surface. The transformation matrix defines the transformation from the embedded content coordinate system to the pixel grid. The transformation matrix can include, for example, scale, rotations and other transformations. |
| Clip path, opacity and mask | Embedded content clip path, opacity and mask. |

Referring again to FIG. 2, each rendering engine 210a-f exposes a respective application programming interface (API) 214a-f common to all rendering engines, which allows the rendering engine to be invoked by the application 202, by another rendering engine, or by itself. In various implementations, an API can be implemented as an instance of one or more classes in an object-oriented programming language, as a set of procedures or functions, as one or more data structures, as a communication protocol, or combinations of these. Each API includes a common set of functionality which is offered by each rendering engine. An unlimited number of rendering engines can be incorporated into the system 200 as long as each rendering engine implements the common API. Moreover, rendering engines can be incorporated into the system dynamically on an as-needed basis from a variety of sources including sources specifying local or remote storage, a uniform resource locator (URL), or a server.

By way of illustration, if an API is implemented as a set of functions a "render" function could be invoked when another rendering engine or the application 202 desires to render embedded content. In particular, the calling rendering engine or application 202 determines a drawing page bounding box, a drawing surface and a background bitmap for embedded content and provides these along with other transparency model parameters when invoking a rendering engine. The invoked rendering engine then renders the embedded content on the drawing surface within the bounding box, potentially blending the embedded content with the background.

The invoked rendering engine can itself have similarly invoked one or more rendering engines to create the rendered drawing surface. The invoked rendering engine renders either directly to the drawing surface provided by the calling rendering engine or to temporary drawing surfaces aligned with the pixel grid of the calling engine's drawing surface. The invoked rendering engine uses a transformation matrix passed to it by the calling engine. Temporary drawing surfaces do not need to be scaled, rotated or otherwise transformed. A calling rendering engine can use the rendered drawing surface of an invoked rendering engine as the calling rendering engine's background. In this way, rendered content in lower transparency stack layers can be blended with content in high levels.

When a blending mode is assigned to embedded content, a calling rendering engine can invoke a rendering engine twice: once to draw upon a fully transparent temporary background surface and a second time to draw on the actual background. Then transparency model backdrop subtraction is used to combine the drawings as described in section 7.3.3 Group Compositing Computation of the PDF REFERENCE: FIFTH EDITION, ADOBE® PORTABLE DOCUMENT FORMAT VERSION 1.6:

$$C=C_n+(C_n-C_0)*(a_0/ag_n-a^0).$$

However in many cases only a single drawing is necessary. For example, if the embedded content is marked as an isolated transparency group, the embedded content can be drawn on a transparent temporary drawing surface and then composited on top of a background. If the embedded content has an opacity smaller than one (i.e., the embedded content is not opaque) or clipping is assigned (with a blending mode), the embedded content should be drawn on top of the temporary drawing surface initialized with the copy of the background and then the result of drawing (C) is a weighted average of the painted pixels colors ($C_n$) from the temporary surface and unpainted pixels from the background surface ($C_0$): $C=C_n*a*f+C_n*(1-a*j)$, where a is embedded content's assigned opacity and ƒ is clipping function which is 1 inside the clip path and 0 outside. If the embedded content has opacity=1 (i.e., opaque) and no clipping is assigned, then the calling rendering engine should call the invoked rendering engine to draw directly on the calling rendering engine's drawing surface.

The eBook reader application 202 can also include a digital rights management (DRM) module 208 for use in controlling access to documents and content within documents. For example, the DRM module 208 can include information regarding how content in a document (including embedded content) can be accessed, displayed or used. The DRM module can provide authorization functionality for authorizing users and determining their access rights to content. DRM information can be associated with a document as metadata associated with each piece of content in the document, or with the document as a whole. Alternatively, DRM information for content in a document can be provided externally by a DRM server or other system. The APIs 214a-214f can also include functionality for utilizing DRM data. In some implementations, each rendering engine is responsible for determining whether a user associated with the document being rendered has rights to render a piece of content.

Figure 3:
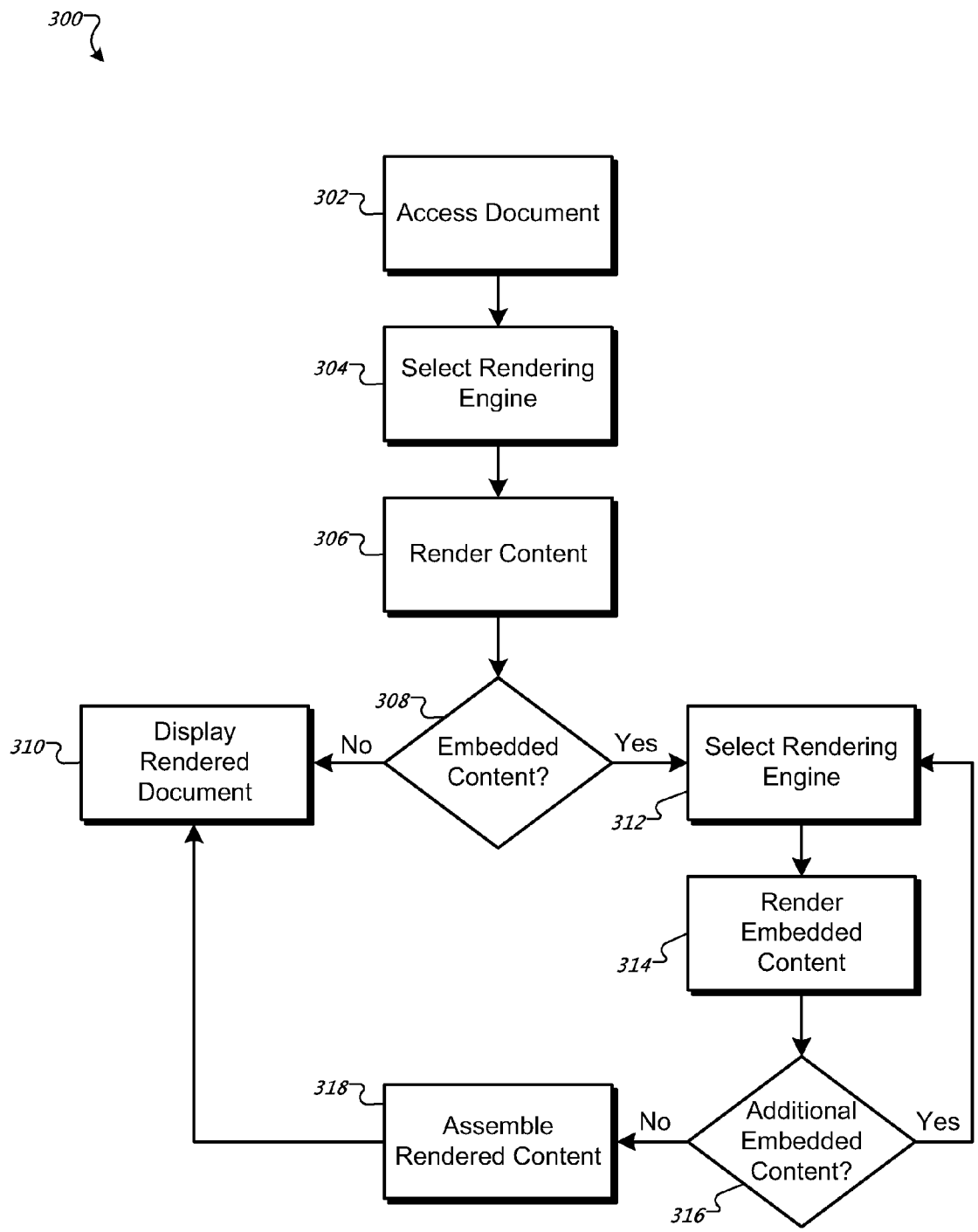
FIG. 3 is a flow chart of an example method for rendering an electronic document containing content having different content file types.

FIG. 3 is a flow chart of an example method 300 for rendering a document containing content having different content file types. The technique 300 can be performed, for example, by a system such as the system 200. First, a document is accessed (e.g., document 120; step 302). The document 120 contains embedded content having different content file types, as described above. Based on the overall content file type of the document, a rendering engine is selected (step 304). For example, if the eBook reader application 202 is preparing to render a Flash-formatted document 120 on the display device 204, the application 202 can select the Flash rendering engine 210c. Selecting the appropriate rendering engine from the group of rendering engines 210a-210f can be based, for example, on the document's file name (e.g., "pdf" from "filename.pdf"), metadata, or by parsing the document for information that indicates its top-level content file type.

The application 202 invokes the selected rendering engine to render the document content (step 306). The application 202 can invoke a rendering engine through the rendering engine's API. The application 202 can also provide the transparency model 216 to the rendering engine. The rendering engine then begins rendering the document 120. If the document does not contain embedded content (step 308), the rendered document is displayed on a display device (e.g., 204; step 310). Otherwise, a rendering engine is selected to render the embedded content (step 312). For example, the enclosing document 120, which can be a Flash document, can also contain one or more instances of embedded content having a different content file type (e.g., PDF). Using the selected rendering engine, the embedded content in the document is rendered (step 314). If the document contains additional embedded content (step 316), a rendering engine is selected to render the additional embedded content (step 312). Otherwise, all of the rendered content is assembled on a document page (step 318) and displayed on a display device (step 310).

Figure 4:
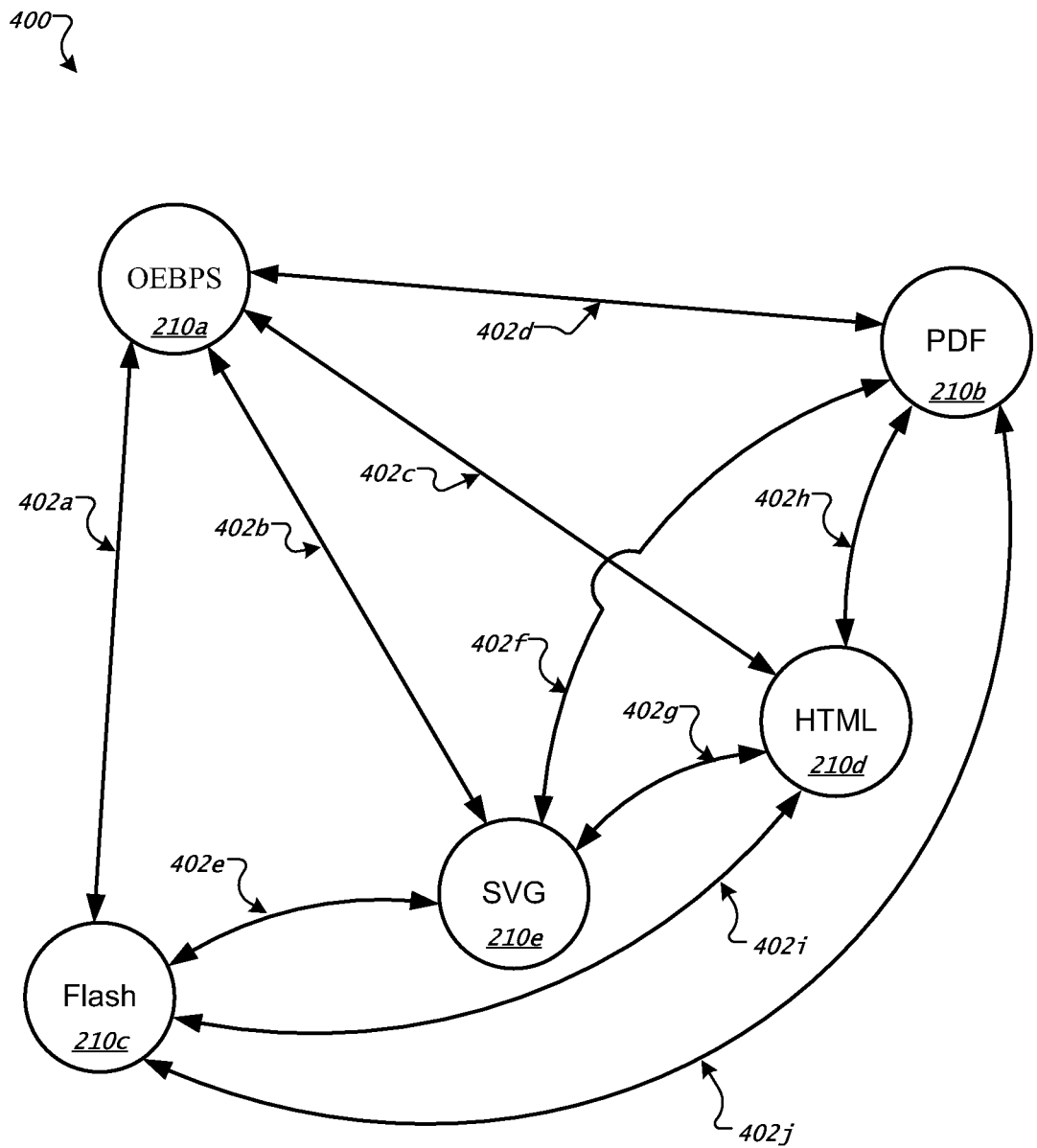
FIG. 4. is a schematic diagram showing an example of interactions that can occur among rendering engines while processing content of different content file types.

FIG. 4. is a schematic diagram 400 showing an example of interactions that can occur among rendering engines while processing content of different content file types. Such a process can occur, for example, while the application 202 is processing a document for display on the display device 204. The diagram 400 depicts an OEBPS rendering engine as node 210a, a PDF rendering engine as node 210b, an HTML rendering engine as node 210d, an SVG rendering engine as node 210e, and a Flash rendering engine as node 210c. The bi-directional arrows 402a-j connecting every node to all other nodes represent possible process flow during the rendering of a document. That is to say, a given rendering engine can invoke any other rendering engine through the rendering engine's respective API. As described above, the information provided directly or indirectly to rendering engines includes transparency model information and the embedded content.

By way of illustration, rendering of document tree 140 will be explained. Initially, the eBook reader application 202 invokes the OEBPS rendering engine 210a since the overall document type is OEBPS. The OEBPS rendering engine 210a renders the text 122 and upon encountering the maple leaf image 124 on the document page, the OEBPS rendering engine 210a invokes the PDF rendering engine 210b to render the image 124. When the PDF rendering engine 210b detects the embedded scissor graphic 128, the PDF rendering engine 210b invokes the SVG rendering engine 210e to render the scissor graphic 128. Once the SVG rendering engine 210e has finished rendering the scissor graphic 128, the PDF rendering engine 210b can finish rendering the leaf image 124, which is composited with the rendered scissor graphic 128. Then, the OEBPS rendering engine 210a invokes the Flash rendering engine 210c to render the pumpkin graphic 126. The Flash rendering engine 210c likewise invokes the HTML rendering engine 210d to render the embedded HTML content 130. As each rendering engine completes its job, calling rendering engines can composite their contents with the results.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what can be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the invention have been described. Other implementations are within the scope of the following claims. For example, the actions recited in the claims can be performed in a different order and still achieve desirable results.

What is claimed is:

1. A system for displaying an electronic document, the system comprising:
    a display device for presenting a rendered electronic document;
    an electronic document including first embedded content and second embedded content within the first embedded content, wherein a file type of the electronic document differs from respective file types of the first and second embedded contents;
    a document handling application configured to invoke rendering engines to render documents on the display device;
    a plurality of rendering engines, each rendering engine having a common interface, wherein each of the rendering engines is configured to render content associated with at least one corresponding file type; and
    one or more processors configured to perform operations comprising:
        identifying, by the document handling application, a first file type of the first embedded content and a first rendering engine that is configured to render embedded content of the first file type;
        invoking, by the document handling application and in response to the identification, the first rendering engine through the first rendering engine's common interface to render the first embedded content;
        identifying, by the first rendering engine, the second embedded content within the first embedded content;
        identifying, by the first rendering engine and in response to identifying the second embedded content within the first embedded content, a second file type of the second embedded content within the first embedded content and a second rendering engine that is configured to render embedded content of the second type;
        invoking, by the first rendering engine and in response to identifying the second file type, the second rendering engine through the second rendering engine's common interface to render the second embedded content;
        receiving, by the first rendering engine, the rendered second embedded content from the second rendering engine;
        rendering, by the first rendering engine and in response to receiving the rendered second embedded content, the first embedded content;
        blending, by the first rendering engine, the rendered second embedded content with the rendered first embedded content;
        receiving, by the document handling application, the blended rendered first and second embedded content from the first rendering engine;
        rendering, by the document handling application and after receiving the blended rendered first and second embedded content, the electronic document;
        blending the blended rendered first and second embedded content with the rendered electronic document; and
        displaying, by the display device, the blended first and second embedded content and rendered electronic document where the first file type is different from the second file type and the first rendering engine is different from the second rendering engine.

2. The system of claim 1, wherein the document handling application contains one of the rendering engines.

3. The system of claim 1, the operations further comprising:
    applying a transparency model transformation matrix to the blended embedded content.

4. The system of claim 1, wherein:
    the first file type and the second file type are each one of PDF, Flash, HTML, ShockWave, or SVG.

5. The system of claim 1, wherein at least one of the plurality of rendering engines is a reentrant rendering engine.

6. The system of claim 5,
    wherein the first rendering engine identifies itself as configured to render embedded content of the second type; and
    wherein the first rendering engine invokes itself through the first rendering engine's common interface.

7. A method for displaying an electronic document, the method comprising:
    identifying, by a document handling application, a first file type of first embedded content and a first rendering engine that is configured to render embedded content of the first file type, the electronic document including the first embedded content and second embedded content within the first embedded content, wherein a file type of the electronic document differs from respective file types of the first and second embedded contents, the document handling application configured to invoke rendering engines to render documents on a display device for presenting a rendered electronic document, the first rendering engine being a member of a plurality of rendering engines, each rendering engine having a common interface, wherein each of the rendering engines is configured to render content associated with at least one corresponding file type;
    invoking, by the document handling application and in response to the identification, the first rendering engine through the first rendering engine's common interface to render the first embedded content;
    identifying, by the first rendering engine, the second embedded content within the first embedded content;
    identifying, by the first rendering engine and in response to identifying the second embedded content within the first embedded content, a second file type of the second embedded content within the first embedded content and a second rendering engine that is configured to render embedded content of the second type;
    invoking, by the first rendering engine and in response to identifying the second file type, the second rendering engine through the second rendering engine's common interface to render the second embedded content;
    receiving, by the first rendering engine, the rendered second embedded content from the second rendering engine;
    rendering, by the first rendering engine and in response to receiving the rendered second embedded content, the first embedded content;
    blending, by the first rendering engine, the rendered second embedded content with the rendered first embedded content;

receiving, by the document handling application, the blended rendered first and second embedded content from the first rendering engine;

rendering, by the document handling application and after receiving the blended rendered first and second embedded content, the electronic document;

blending the blended rendered first and second embedded content with the rendered electronic document; and displaying, by the display device, the blended first and second embedded content and rendered electronic document where the first file type is different from the second file type and the first rendering engine is different from the second rendering engine.

8. The system of claim 7, wherein the document handling application contains one of the rendering engines.

9. The system of claim 7, the operations further comprising:

applying a transparency model transformation matrix to the blended embedded content.

10. The system of claim 7, wherein:

the first file type and the second file type are each one of PDF, Flash, HTML, ShockWave, or SVG.

11. The system of claim 7, wherein at least one of the plurality of rendering engines is a reentrant rendering engine.

12. The system of claim 11, wherein the first rendering engine identifies itself as configured to render embedded content of the second type; and wherein the first rendering engine invokes itself through the first rendering engine's common interface.

13. A non-transitory computer-readable storage medium having stored therein instructions that when executed perform operations comprising:

identifying, by a document handling application, a first file type of first embedded content and a first rendering engine that is configured to render embedded content of the first file type, the electronic document including the first embedded content and second embedded content within the first embedded content, wherein a file type of the electronic document differs from respective file types of the first and second embedded contents, the document handling application configured to invoke rendering engines to render documents on a display device for presenting a rendered electronic document, the first rendering engine being a member of a plurality of rendering engines, each rendering engine having a common interface, wherein each of the rendering engines is configured to render content associated with at least one corresponding file type;

invoking, by the document handling application and in response to the identification, the first rendering engine through the first rendering engine's common interface to render the first embedded content;

identifying, by the first rendering engine, the second embedded content within the first embedded content;

identifying, by the first rendering engine and in response to identifying the second embedded content within the first embedded content, a second file type of the second embedded content within the first embedded content and a second rendering engine that is configured to render embedded content of the second type;

invoking, by the first rendering engine and in response to identifying the second file type, the second rendering engine through the second rendering engine's common interface to render the second embedded content;

receiving, by the first rendering engine, the rendered second embedded content from the second rendering engine;

rendering, by the first rendering engine and in response to receiving the rendered second embedded content, the first embedded content;

blending, by the first rendering engine, the rendered second embedded content with the rendered first embedded content;

receiving, by the document handling application, the blended rendered first and second embedded content from the first rendering engine;

rendering, by the document handling application and after receiving the blended rendered first and second embedded content, the electronic document;

blending the blended rendered first and second embedded content with the rendered electronic document; and displaying, by the display device, the blended first and second embedded content and rendered electronic document where the first file type is different from the second file type and the first rendering engine is different from the second rendering engine.

14. The computer-readable medium of claim 13, wherein the document handling application contains one of the rendering engines.

15. The computer-readable medium of claim 13, the operations further comprising:

applying a transparency model transformation matrix to the blended embedded content.

16. The computer-readable medium of claim 13, wherein:

the first file type and the second file type are each one of PDF, Flash, HTML, ShockWave, or SVG.

17. The computer-readable medium of claim 13, wherein at least one of the plurality of rendering engines is a reentrant rendering engine.

18. The computer-readable medium of claim 17, wherein the first rendering engine identifies itself as configured to render embedded content of the second type; and wherein the first rendering engine invokes itself through the first rendering engine's common interface.

* * * * *